(12) United States Patent
Koppelaars

(10) Patent No.: US 11,080,268 B2
(45) Date of Patent: Aug. 3, 2021

(54) METHOD FOR SERIALIZING TRANSACTIONS TO ENFORCE GENERAL-PURPOSE INTEGRITY CONSTRAINTS

(71) Applicant: Oracle International Corporation, Redwood Shores, CA (US)

(72) Inventor: Toon Koppelaars, Zaltbommel (NL)

(73) Assignee: Oracle International Corporation, Redwood Shores (CA)

( * ) Notice: Subject to any disclaimer, the term of this patent is extended or adjusted under 35 U.S.C. 154(b) by 369 days.

(21) Appl. No.: 16/247,434

(22) Filed: Jan. 14, 2019

(65) Prior Publication Data
US 2020/0226122 A1 Jul. 16, 2020

(51) Int. Cl.
*G06F 16/23* (2019.01)
*G06F 16/2455* (2019.01)
*G06F 16/22* (2019.01)

(52) U.S. Cl.
CPC ...... *G06F 16/2365* (2019.01); *G06F 16/2282* (2019.01); *G06F 16/2343* (2019.01); *G06F 16/2379* (2019.01); *G06F 16/2456* (2019.01)

(58) Field of Classification Search
CPC ............. G06F 16/2365; G06F 16/2379; G06F 16/2343; G06F 16/2456; G06F 16/2282; G06F 16/2308; G06F 16/1865; G06F 16/2336; G06F 16/27
USPC ........................................................ 707/703
See application file for complete search history.

(56) References Cited

U.S. PATENT DOCUMENTS

| 7,155,434 | B1 * | 12/2006 | Luo ..................... G06F 16/2343 |
| 2011/0296533 | A1 * | 12/2011 | Becker ................ G06F 21/6218 726/30 |
| 2019/0065573 | A1 * | 2/2019 | Keller .................. G06F 16/2453 |

OTHER PUBLICATIONS

Koppalarrs, Toon, "SQL Assertions/ Declarative multi-row constraints", available at https://community.oracle.com/tech/apps-infra/discussion/4390732/sql-assertions-declarative-multi-row-constraints, Nov. 2017.*
Lex de Haan et al., "Applied Mathematics for Database Professionals (Expert's Voice)", Apress dated Jun. 19, 2007, 60 pages.

* cited by examiner

*Primary Examiner* — Matthew Ell
*Assistant Examiner* — Andalib F Lodhi
(74) *Attorney, Agent, or Firm* — Hickman Becker Bingham Ledesma LLP

(57) ABSTRACT

Techniques are disclosed for serializing assertion-triggering transactions by locking special purpose resources (i.e. other than rows or tables), which enables a high level of concurrency for these transactions while at the same time ensuring correctness of the SQL assertion validation code. The techniques involve creating objects referred to therein as "Assertion-Locking Memory-Objects" or "ALMOs". The database server causes each assertion-triggering transaction to obtain locks on one or more ALMOs prior to determining whether the changes made by assertion-triggering transaction violates the assertion. Because locks on the ALMOs are finer than the table locks, fewer transactions are blocked by ALMO locks.

14 Claims, 13 Drawing Sheets

| Lock-mode | X | SX | S |
|---|---|---|---|
| X | Block | Block | Block |
| SX | Block | OK | Block |
| S | Block | Block | OK |

FIG. 1

| Time(t) | TX1 | TX2 | Comments |
|---|---|---|---|
| 1 | Insert a president Guard-query detects need for revalidation Lock/hash('at_most_one_president',X) | | Acquires lock in X-mode |
| 2 | | | |
| 3 | Verify the at_most_one_president SQL assertion by revalidating the full Boolean expression | | This succeeds, as only one row visible: the just inserted president |
| 4 | | Insert a president (which potentially violates the SQL assertion) Guard-query detects need for revalidation Lock/hash('at_most_one_president',X) | |
| 5 | | | This blocks Lock released by TX1, TX2 can proceed |
| 6 | Commit | | |
| 7 | | Verify the at_most_one_president SQL assertion by revalidating the full Boolean expression | This now sees two presidents and fails. |

FIG. 3

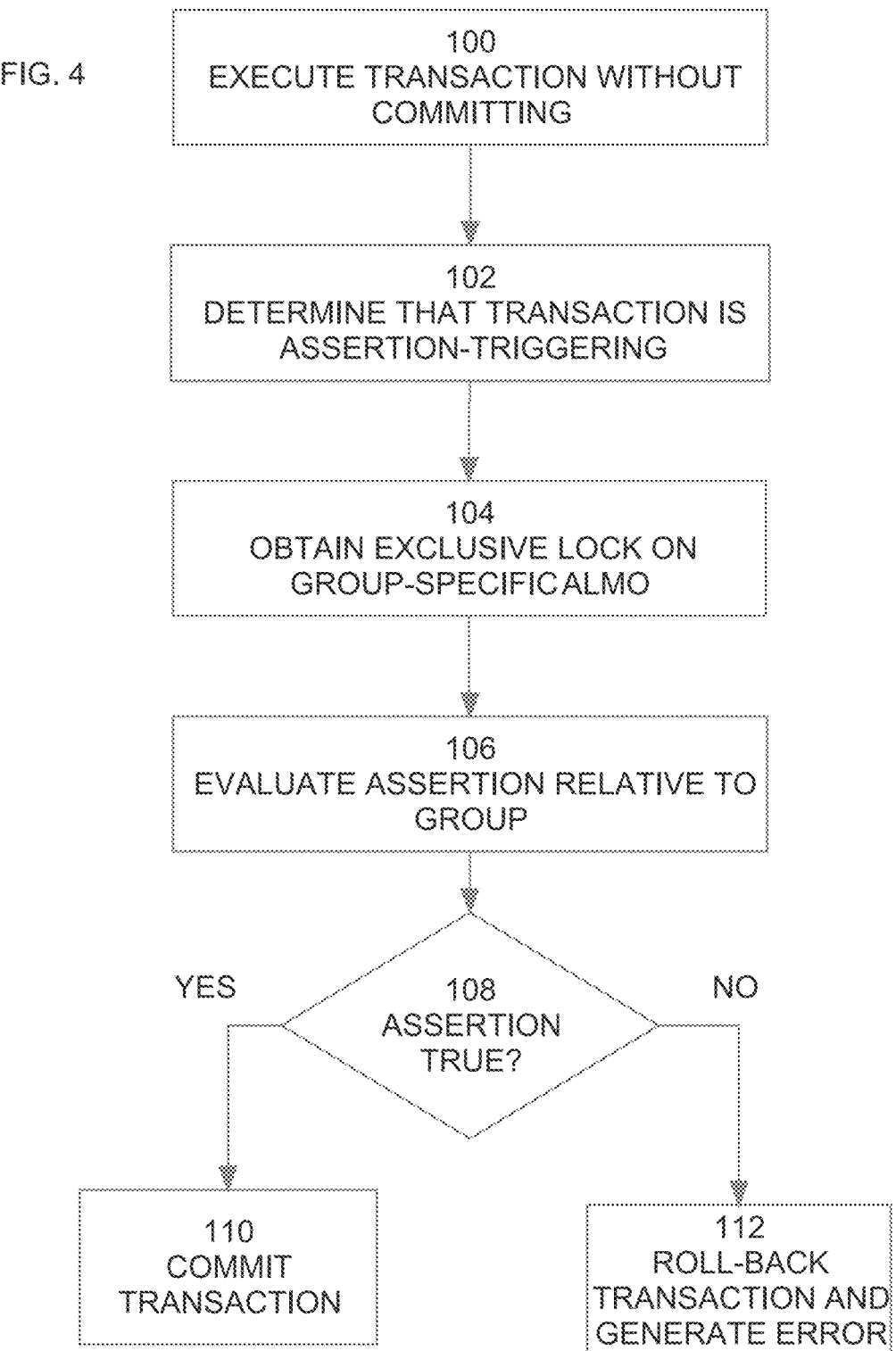

| Time(t) | TX1 | TX2 | Comments |
|---|---|---|---|
| 1 | Insert a trainer for department 10 into employees table. Guard-query detects need for incremental revalidation of value 10 | | |
| 2 | Lock(hash('no_trainers_in_boston'),S) Lock(hash('no_trainers_in_boston10'),X) | | This succeeds. |
| 3 | Verify the no_trainers_in_boston SQL assertion by revalidating the UQ only for value 10. | | |
| 4 | | Update department 10 to location Boston. Guard-query detects need for incremental revalidation of value 10 | |
| 5 | | Lock(hash('no_trainers_in_boston'),S) Lock(hash('no_trainers_in_boston10'),X) | This blocks on the 2nd lock. |
| 6 | Commit | | Locks released by TX1. TX2 can proceed. |
| 7 | | Verify the no_trainers_in_boston SQL assertion by revalidating the UQ only for value 10. | This now sees a trainer (in Boston) and fails. |

FIG. 6

| Time(t) | TX1 | TX2 | Comments |
|---|---|---|---|
| 1 | Insert SP-row to reflect S10 supplies P42. Guard-query detects need for incremental revalidation of value S10. | | |
| 2 | Lock/hash('S_SP_S'),S) Lock/hash('S_SP_S10'),X) | | |
| 3 | Verify the cannot_supply_all_parts SQL assertion by revalidating the UQ only for value S10. | | This succeeds. As there is still part P43 that isn't supplied by S10. |
| 4 | | Delete part P43. Guard-query detects need for revalidation. Lock/hash('S_SP_S'),X) | |
| 5 | | | This blocks. |
| 6 | Commit | | |
| 7 | | Verify the cannot_supply_all_parts SQL assertion by revalidating the full Boolean expression. | This fails as S10 would supply all parts. |

FIG. 7

| Time(t) | TX1 | TX2 | Comments |
|---|---|---|---|
| 1 | Update supplier S10 to become a high-risk supplier. Guard-query detects need for incremental revalidation of value S10 of the S-SP join-group. Lock({hash('S_SP_P'),S}) Lock({hash('S'SP_P,KG1(S10')),X}) Lock({hash('S_SP_PS'),SX}) Lock({hash('S_SP_PP'),S}) | | |
| 2 | Verify the P_SP_P_SQL assertion by revalidating the UQ only for value S10 of the first join-group. | | This succeeds. |
| 3 | | Update part P42 to cost 120. Guard-query detects need for incremental revalidation of value P42 of the SP-P join-group. Lock({hash('S_SP_P'),S}) Lock({hash('S_SP_P,KG2(P42')),X}) Lock({hash('S_SP_PP'),SX}) Lock({hash('S_SP_PS'),S}) | This blocks on the third (and fourth) lock request. |
| 4 | Commit | | Locks released by TX1. TX2 can proceed. |
| 5 | | Verify the P_SP_P_SQL assertion by revalidating the UQ only for value P42 of the second join-group. | This now fails, as it sees supplier S10 to be high-risk. |

FIG. 12

METHOD FOR SERIALIZING TRANSACTIONS TO ENFORCE GENERAL-PURPOSE INTEGRITY CONSTRAINTS

FIELD OF THE INVENTION

The present invention relates to enforcing SQL assertions and, more specifically, to techniques for serializing assertion-triggering transactions to enforce SQL assertions.

BACKGROUND

"Assertions" are Boolean expressions that declare general-purpose data integrity constraints. SQL assertions are assertions that are specified with embedded (sub) queries that reference one or more tables in a database. For example, the at_most_one_president SQL assertion set forth below is a Boolean expression, specified in an embedded query, that refers to the table "EMPLOYEES". The Boolean expression specified in the at_most_one_president is TRUE when there is no more than one president in the EMPLOYEES table.

```
AT_MOST_ONE_PRESIDENT ASSERTION:
create assertion at_most_one_president as check
    ((select count(*)
        from EMPLOYEES e
        where e.job = 'PRESIDENT') <= 1)
```

When a SQL assertion is registered with a database system, the database system is responsible for ensuring that, in every committed state of the database, the assertion evaluates to TRUE. Stated another way, the database server does not commit any transaction when committing the transaction would leave the database in a committed state in which a registered assertion would evaluate to FALSE.

As used herein, a SQL command that has the potential to leave the database in a state that violates an assertion is referred to herein as an "assertion-triggering command". A transaction that contains an assertion-triggering command is referred to herein as an "assertion-triggering transaction". For example, in a database system with the at_most_one_president assertion, any database command that inserts a row in the EMPLOYEE table, or updates a value in the "job" column of an existing row of the EMPLOYEE table, is an assertion-triggering command. Any transaction that executes such a command is an assertion-triggering transaction.

To enforce SQL assertions, whenever an assertion-triggering transaction executes, the database server should verify that these changes do not violate the declared SQL assertions. This verification could involve re-evaluating the full—or possibly a smaller—Boolean expression, which in turn always involves executing queries.

For example, assume that the at_most_one_president assertion has been registered with a database server. When a transaction performed by the database server inserts a row with "president" in the "job" column, the database server must revalidate this SQL assertion to ensure its continued "truthness". This revalidation will have to execute the embedded query of the at_most_one_president assertion to count the number of presidents after the insert.

Types of Assertions

The at_most_one_president assertion described above is an example of a "NO-SET-UQ assertion". A NO-SET-UQ assertion is an assertion that must be evaluated against all rows in a table, not separately against groups of rows, where each group corresponds to a value in a set of values. In the case of the at_most_one_president assertion, every row in the employee table must be taken account to know whether the addition of a new president (either by the insertion of a row that designates a president, or an update that changes an existing row to president) violates the assertion. Stated another way, a NO-SET-UQ assertion is an assertion that does not universally quantify over some set of values. Universal quantification is explained, for example, at en.wikipedia.org/wiki/Universal_quantification. NO-SET-UQ assertions cannot be specified with a leading universal quantifier.

In contrast to NO-SET-UQ assertions, a "SINGLE-SET-UQ assertion" is an assertion that universally quantifies over a single set of values. For example, an at_most_one_manager_per_dept assertion may assert that each department has no more than one manager. Since the EMPLOYEES table has employees from multiple departments, it is possible for the EMPLOYEES table to have multiple rows where "job" is "manager". However, each of those "manager" rows must correspond to a different department.

The truthness of a SINGLE-SET-UQ assertion is determined by separately evaluating the assertion for each group. In the case of the at_most_one_manager_per_dept, the groups correspond to departments. That is, all rows within the EMPLOYEES table that correspond to department "sales" is one group, while all rows within the EMPLOYEES table that correspond to department "IT" is another group. An assertion that specifies a SINGLE-SET-UQ assertion is true only if the assertion evaluates to true for each group.

To determine whether an assertion-triggering transaction violates a SINGLE-SET-UQ assertion, only the rows that belong to the relevant group need to be inspected. For example, assume that a row is inserted where "job" is "manager" and "department" is "sales". To determine whether the at_most_one_manager_per_dept has been violated, the at_most_one_manager_per_dept assertion can be evaluated based exclusively on the rows, within the EMPLOYEES table, that correspond to the "sales" department.

A "MULTI-SET-UQ assertion" is an assertion that universally quantifies over multiple sets of values. MULTI-SET-UQ assertions can be specified with multiple nested leading universal quantifiers. As shall be explained in detail below, the order in which the quantifiers are nested can be changed without affecting the semantics of the assertion. MULTI-SET-UQ assertions are described in detail hereafter.

Using Table Locks to Prevent Assertion Violations

Since an assertion-triggering transaction cannot be allowed to commit until the relevant SQL assertions are verified, the verification takes place within the context of the assertion-triggering transaction. The verification of an assertion typically involves executing the query associated with the assertion to confirm that the expression contained therein still evaluates to TRUE. For example, if an assertion-triggering transaction TX1 makes a change to a table T1, then the query to evaluate the SQL assertion is executed as part of transaction TX1.

Whenever two assertion-triggering transactions for the same assertion execute concurrently, and both require query execution to re-evaluate the truth of a given SQL assertion, their respective assertion-evaluating queries do not see the uncommitted changes of the other assertion-triggering transactions. Consequently, in each assertion-triggering transaction, the database server might conclude that the transaction is valid with respect to the given SQL assertion, even though the combination of both transactions, once committed, results in a database state that does not comply with the SQL assertion.

For example, assume that the EMPLOYEES table initially has no "president" row. Further assume that TX1 and TX2 are executing concurrently, and that each inserts a "president" row in the EMPLOYEES table. Neither transaction will see the uncommitted change made by the other transaction, so both may conclude that the EMPLOYEES table does not have any "president" row besides the one row just inserted by the current transaction. After both TX1 and TX2 commit their changes, the EMPLOYEES table has two "president" rows, and the at_most_one_president assertion is violated. Such simultaneously executing transactions that involve the same SQL assertion require careful serialization in order for the SQL assertion validation code, which executes within the context of each transaction, to be correct.

Classical locking mechanisms, such as table-locks, can be used for serializing these assertion-triggering transactions. For example, assume that two concurrent assertion-triggering transactions TX1 and TX2 are inserting a president into the EMPLOYEE table. TX1 may obtain an exclusive write lock on the EMPLOYEES table. Because TX1 obtained the exclusive lock on the EMPLOYEE table first, TX2 is blocked until the exclusive lock is released. After TX1 obtains the lock, TX1 may insert the row that corresponds to a president, and evaluate the truthness of the at_most_one_president assertion. Assuming that no existing row was for a president, the at_most_one_president will evaluate to TRUE and TX1 can commit. Upon committing, TX1 releases the exclusive write lock on EMPLOYEE. With the lock released, TX2 may obtain the lock and insert a row for a second president into EMPLOYEE. TX2 then re-evaluates the at_most_one_president assertion. At this point, the assertion fails because TX2 sees both its own row for president, and the row of the president that was inserted by the committed transaction TX1 Consequently, TX1 will fail and roll back. Thus, the database would never reflect a committed state in which the assertion is false.

Unfortunately, table locks are so coarse that using them to serialize assertion-triggering transactions unnecessarily reduces the performance of a database system. For example, assume that 100 concurrent transactions are updating rows in the EMPLOYEES table. Assume that only one of those transactions is an assertion-triggering transaction (e.g., only one of the transactions is changing the "job" field of a row to "president"). To prevent any violation of the at_most_one_president assertion, the assertion-triggering transaction obtains an exclusive write lock on the EMPLOYEES table. Obtaining that exclusive write lock on the EMPLOYEES table causes the remaining 99 transactions, which are not assertion-triggering transactions, to wait until the one transaction completes. In this case, there is no justification for those 99 transactions to wait, because none of those transactions could possibly affect the truth of the at_most_one_president assertion.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a table illustrating the compatibility of various types of locks;

FIG. 3 is a block diagram illustrating the sequence of operations of two concurrently-executing assertion-triggering transactions for the at_most_one_president SQL assertion, according to an embodiment;

FIG. 4 is a flowchart that illustrates the steps performed by the database server to enforce a SINGLE-SET-UQ assertion, according to one embodiment;

FIG. 6 is a block diagram illustrating the sequence of operations of two concurrently-executing assertion-triggering transactions for the no-trainers-in-boston SQL assertion, according to an embodiment;

FIG. 7 is a block diagram illustrating how the database server handles two concurrently-executing assertion-triggering transactions for the no-supplier-supplies-all-parts SQL assertion, according to an embodiment;

FIG. 12 is a block diagram illustrating how the database server handles two concurrently-executing assertion-triggering transactions for the "High-risk Supplier Cannot Supply Parts Costing 1000 or More" assertion, according to an embodiment;

DETAILED DESCRIPTION

Figure 2:
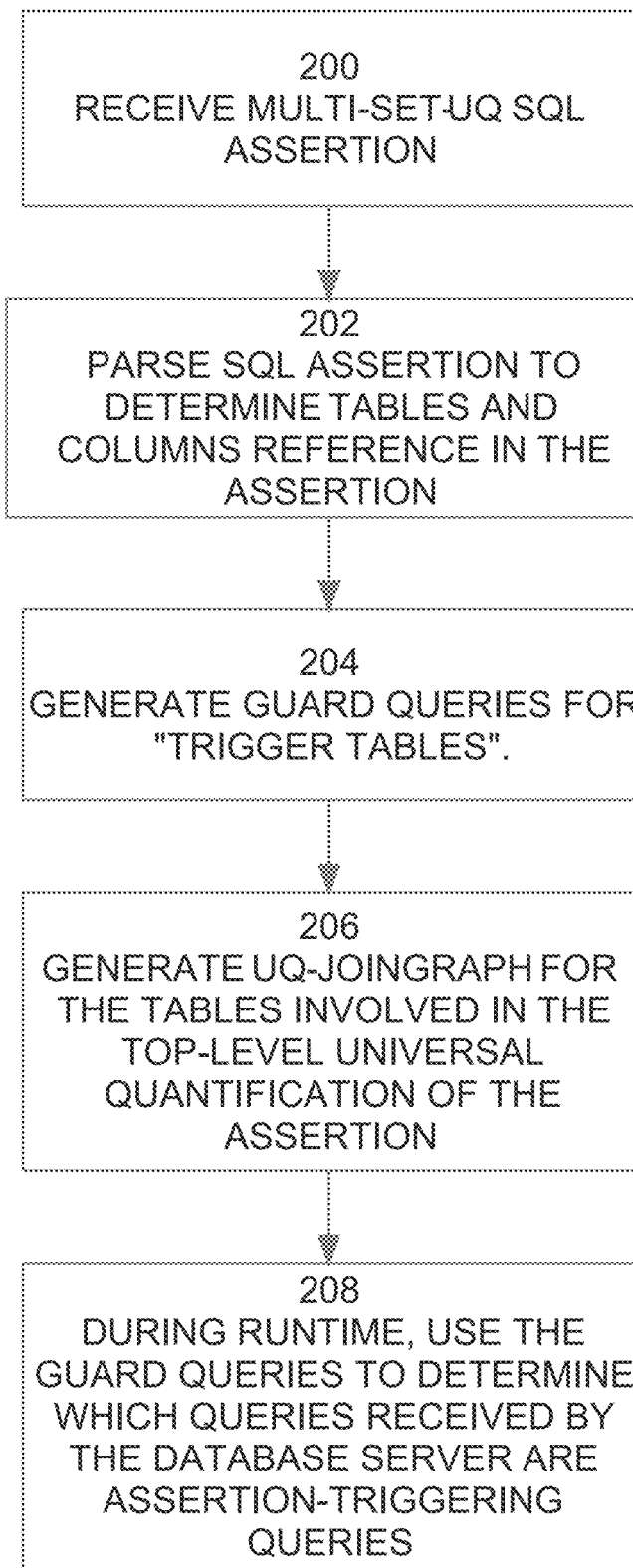
FIG. 2 is a flowchart illustrating steps for enforcing SQL assertions, according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for serializing assertion-triggering transactions by locking special purpose resources (i.e. other than rows or tables), which enables a high level of concurrency for these transactions while at the same time ensuring correctness of the SQL assertion validation code. As shall be described in detail hereafter, the techniques involve creating objects referred to therein as "Assertion-Locking Memory-Objects" or "ALMOs". The database server causes each assertion-triggering transaction to obtain locks on one or more ALMOs prior to determining whether the changes made by assertion-triggering transaction violates the assertion.

Because locks on the ALMOs are finer grained than table locks, fewer transactions are blocked by ALMO locks. Specifically, transactions that are not assertion-triggering transactions for an assertion do not need to obtain a lock on the ALMO of the assertion while performing a Data Manipulation Language (DML) operation on a table referenced by the assertion. Consequently, transactions that are not assertion-triggering transactions are never blocked by ALMO locks, even if they otherwise make changes to a table referenced in the assertion. Because fewer transactions are blocked, the overall performance of the database system improves.

For example, assume again that 100 concurrent transactions are updating rows in the EMPLOYEES table. Assume that only one of those transactions is an assertion-triggering transaction (e.g., only one of the transactions is changing the "job" field of a row to "president"). To prevent any violation of the at_most_one_president assertion, the assertion-triggering transaction obtains a lock on an ALMO for the at_most_one_president assertion in the exclusive mode. Obtaining that exclusive mode lock on the at_most_one_president ALMO does not block the remaining 99 transactions, because they are not assertion-triggering transactions and do not need to await the release of the lock on the at_most_one_president ALMO to proceed with their updates.

Techniques are provided for using ALMO locks to enforce NO-SET-UQ assertions, SINGLE-SET-UQ assertions, and MULTI-SET-UQ assertions.

ALMOs Implementations

ALMOs may be implemented in a variety of ways, and the techniques described herein are not limited to any particular ALMO implementation. In one embodiment, an in-memory hash table is employed to implement the ALMOs. Specifically, to obtain a lock on an ALMO, a hash function is applied to the unique identifier of the ALMO to produce a hash value that maps to a bucket of the hash table. That bucket of the hash table is treated as the lock resource for the ALMOs whose unique identifiers hash to it.

Locking ALMOs

According to one embodiment, locks may be obtained in various modes on the ALMOs associated with SQL assertions. FIG. 1 is a table illustrating the compatibility of shared mode locks (S locks), shared-exclusive mode locks (SX locks), and exclusive mode locks (X locks). Specifically, S locks block SX and X locks. SX locks block S and X locks. X locks block S, X, and SX locks.

For the purpose of discussion, it shall be assumed that ALMOs are locked by (a) generating an identifier for the ALMO, and (b) obtaining a lock on the hash bucket to which the identifier hashes. Acquiring a lock of a given mode, say M, on an ALMO id shall be represented as: lock(id,M).

According to one embodiment, ALMOs (their identifiers) can be allocated on the fly. In such an embodiment, whenever the need to serialize arises, the database server generates an SQL assertion-specific, alphanumeric string (representing the identifier for the ALMO). This string depends upon the name of the SQL assertion that is required to be re-validated. Appended to this name will be (if applicable) a join-group identifier, and (if applicable) a column-value(s). The database server hashes this string value to produce an id-value (hash value) for the ALMO (hash bucket). By choosing a sufficiently large hash table, the chances of two different ALMO names colliding to the same hash-value are minimized.

When an assertion-triggering transaction attempts to get a lock on a bucket that is already locked by an incompatible lock granted to another assertion-triggering transaction, the assertion-triggering transaction must wait for the incompatible lock to be released. Thus, each bucket may have its own waiting queue, where transactions that are awaiting locks on a bucket wait until all incompatible locks that were requested ahead of them have been released.

All locks acquired at run-time on ALMOs, when DML statements execute, will be released at the end of the transaction, upon commit or rollback.

Guard Queries and Join-Graphs

According to one embodiment, enforcement of assertions involves the use of "Guard Queries" and "UQ-JoinGraphs". A "guard query" is a query used to determine whether a transaction is an assertion-triggering transaction. In one embodiment, guard queries are executed against the changes that were made by a transaction, before the transaction commits, to determine whether any of those changes triggers an assertion. A "UQ-JoinGraph" is a graph that reflects the tables, and the join relationships between the tables, specified in the SQL associated with an SQL assertion, that are involved in the top level (nested) universal quantifiers.

Referring to FIG. 2, it is a flowchart illustrating steps for enforcing SQL assertions, according to one embodiment. At step 200, an assertion is received by the database server. For the purpose of explanation, it shall be assumed that an "S_SP_P assertion" is received at step 200. The "S_SP_P assertion" mandates that there cannot be high-risk suppliers that supply a part whose price is 1000 or more. The S_SP_P assertion may be created as follows:

```
create assertion S_SP_P as
    check(not exists
        (select 'a tuple in this join' from supplier S, supplier_part SP,
        part P where s.S# = sp.S# and sp.P# = p.P# and s.TYPE =
        'HIGH RISK' and p.PRICE >= 1000))
```

The S_SP_P assertion may be violated by either:

(a) in table s, setting to "High Risk" the "type" of a provider that supplies parts >=$1000, (b) in table p, setting to >=$1000 the price of a part that is supplied by a "High Risk" provider, or (c) inserting in table sp a row that associates a "High Risk" supplier and a part whose price is >=$1000.

Referring again to FIG. 2, in step 202, the database server parses the SQL assertion to determine the tables and columns that are referenced in the assertion. In the present example, tables S, SP and P are referenced in the assertion. In table S, columns "type" and s# are referenced. In table SP, columns s# and p# are referenced. In table P, columns p# and "price" are referenced.

At step 204, based on the information obtained in step 202, "guard queries" are generated for the "trigger tables" of the SQL assertion. A "trigger table" is a table in which a change to the table may cause a violation of the SQL assertion.

In the present example, tables s, p and sp are trigger tables for the S_SP_P assertion, since changes to any one of these tables may cause violation of the S_SP_P assertion. Thus, at step 204, the database server performs an analysis to determine which kinds of change to the involved tables (caused by the execution of a DML statement) can potentially violate the SQL assertion. The outcome of this analysis is a set of guard-queries for the trigger tables involved in the SQL assertion.

At step 206, a UQ-JoinGraph is generated for the tables involved in the top-level universal quantification of the assertion. Specifically, the database server determines whether the SQL assertion can be specified as a top-level universal quantification. If so, the database server determines over which set of values is the assertion quantifying, and what columns in what tables provide the values for this set. The outcome of this analysis is the "UQ-JoinGraph" of the assertion. The UQ-JoinGraph shows, which tables (and columns) involved in the SQL assertion, play a role in the top-level universal quantification.

At step 208, the guard queries are used during runtime to determine which DML statements received by the database server qualify as assertion-triggering statements for the registered assertion, and the UQ-JoinGraph is used to determine what locks must be obtained to evaluate the assertion prior to committing the assertion-triggering statements. Guard queries and UQ-JoinGraphs shall be described in detail hereafter.

No-Set-UQ Assertions

As mentioned above, the at_most_one_president assertion is a NO-SET-UQ assertion. To block concurrent assertion-triggering transactions for the at_most_one_president assertion, an ALMO is created for the at_most_one_president assertion, and all assertion-triggering transactions for the at_most_one_president assertion must obtain an exclusive lock on the at_most_one_president ALMO.

Significantly, requiring the assertion-triggering transactions for the at_most_one_president assertion to obtain an exclusive lock on the at_most_one_president ALMO does not have any detrimental effect on transactions that (a) update the EMPLOYEES table, but (b) are not assertion-triggering transactions for the at_most_one_president assertion.

No-Set-UQ Assertion Example: The At_Most_One_President Assertion

To illustrate the concepts of guard-queries and UQ-Join-Graphs, consider the at_most_one_president assertion:

```
create assertion at_most_one_president as check
    ((select count(*)
      from EMPLOYEES e
      where e.job = 'PRESIDENT') <= 1)
```

The compile-time analysis of the at_most_one_president assertion will determine that this SQL assertion cannot be specified with a top-level universal quantification. Thus, the at_most_one_president assertion produces an empty UQ-JoinGraph.

The compile-time analysis of the at_most_one_president assertion will determine that this SQL assertion can only be violated by a DML statement whose change-effect is that a new president is introduced. That is, violation of the at_most_one_president assertion can only be caused by either an insert statement that creates a new president, or an update statement that introduces a new president (by changing the JOB column value of a row).

At run-time, the database system ("DBMS") uses this knowledge to verify whether the effect of a DML statement that has just executed, is indeed such that the SQL assertion is in need of revalidation. Stated another way, the DBMS will determine whether the DML statement is "assertion-triggering" for the at_most_one_president assertion. Only if this is the case will the DBMS proceed with (a) acquiring the ALMO lock for the at_most_one_president assertion, and (b) revalidating the current new database state with respect to the at_most_one_president assertion.

Note that inspecting the change-effect of a DML statement does not involve querying shared application tables. Therefore, this act of determining whether a DML is assertion-triggering does not require any serialization. The production of the change-effect can be implemented by maintaining a transaction-local temporary table to hold projected copies of rows that are changed/affected while the DML statement is executing. Upon completion of the DML statement, the DBMS can then query this local table to determine if it needs to proceed with revalidating the SQL assertion. As mentioned above, such query is referred to as a "guard query" for the SQL assertion.

Using ALMOs to Enforce No-Set-UQ Assertions

As mentioned above, guard queries are used to determine whether a transaction is "assertion-triggering". For the purpose of explanation, assume that a particular transaction T has made a change to a table. Assume further that execution of a guard query for an assertion X indicates that transaction T is an assertion-triggering transaction for assertion X. Consequently, assertion X needs to be revalidated prior to committing transaction T. Prior to validating assertion X inside transaction T (which requires querying the one or more tables that contain the information required to determine whether the assertion is violated), the database server will acquire various lock-modes on ALMOs to serialize concurrent transactions such that SQL assertion validation will be correct. The database server determines which lock-modes need to be acquired on which resources based on the UQ-JoinGraph and Guard Queries of assertion X.

As explained above, if assertion X is a NO-SET-UQ assertion, the UQ-JoinGraph of assertion X will be empty. Under these circumstances, the database server merely causes transaction T to obtain an exclusive lock on an ALMO whose name is based on the name of the assertion. This lock can be notated as follows:

lock(hash('name-of-sql-assertion'),X)

As explained above, the rationale for this strategy for enforcing NO-SET-UQ assertions is that since the SQL assertion does not constitute a top-level universal quantification, revalidation will always require evaluation of the full Boolean expression. For this evaluation to be stable, only one transaction is allowed to be assertion-triggering with respect to the SQL assertion at a point in time.

With this locking strategy for NO-SET-UQ assertions, two concurrently executing assertion-triggering transactions for the at_most_one_president SQL assertion would execute in the sequence illustrated in FIG. 3.

Single-Set-UQ Assertions

As explained above, a "SINGLE-SET-UQ assertion" is an assertion that universally quantifies over a single set of values. The at_most_one_manager_per_dept assertion is an example of a SINGLE-SET-UQ assertion.

A SINGLE-SET-UQ assertion differs from a NO-SET-UQ assertion in that it is safe to allow assertion-triggering transactions of a SINGLE-SET-UQ assertion to execute in parallel, so long as they are operating on different groups. For example, a transaction that is adding a manager to the "sales" department can run in parallel with a transaction that is adding a manager to the "IT" department. That is, for a SINGLE-SET-UQ assertion, assertion-triggering transactions need to be serialized on a per-group basis, where each group corresponds to a distinct value in the set of values. In the case of the at_most_one_manager_per_dept assertion, the set of values is the department identifiers, and the distinct value within that set is the department identifier specified in the row being inserted and/or updated. Thus, with a transaction that is adding a manager to the "sales" department, the distinct value is "sales" and only those rows that are associated with the department "sales" need to be checked to determine whether the assertion is violated. Similar, for a transaction that is adding a manager to the "IT" department, the distinct value is "IT" and only those rows that are associated with the department "IT" need to be checked to determine whether the assertion is violated.

To enforce a SINGLE-SET-UQ assertion at the group level of granularity, group-specific ALMOs are used. A group-specific ALMO is a memory object that is specific to a unique assertion/group combination. For example, to generate a unique identifier for the "sales" group of the at_most_one_manager_per_dept assertion, the assertion name (e.g. "at_most_one_manager_per_dept") may be combined with the group name ("sales"). The ALMO identified by the result (e.g. "at_most_one_manager_per_dept.sales") would only be used by those assertion-triggering transactions that are adding a manager to the "sales" department.

FIG. 4 is a flowchart that illustrates the steps performed by the database server to enforce a SINGLE-SET-UQ assertion, according to one embodiment. At step 100, the transaction is executed, but not committed.

After the transaction is executed but before the transaction is committed, the database server uses guard queries (step 102) to determine that the transaction is an assertion-triggering transaction for a SINGLE-SET-UQ assertion. For the purpose of explanation, it shall be assumed that the SINGLE-SET-UQ assertion is the at_most_one_manager_per_dept.sales and the transaction is attempting insert a row where "dept" is "sales" and "job" is "manager".

At step 104, the database server causes the transaction to obtain an exclusive lock on the relevant group-specific ALMO. In this example, the transaction would obtain a lock on the ALMO identified by at_most_one_manager_per_dept.sales. Obtaining such a lock does not block assertion-triggering transactions that affect any other groups. For example, obtaining an exclusive lock on the at_most_one_manager_per_dept.sales ALMO would not block a second transaction that is inserting a row where department is "IT" and job is "manager". That second transaction would have to obtain an exclusive lock on a different group-specific ALMO (i.e. the at_most_one_manager_per_dept.IT ALMO).

Once the exclusive lock is obtained in step 104, the database server evaluates the assertion relative to the group at step 108. In the present example, the database server executes a query to determine whether the EMPLOYEES table has no more than one row where department is "sales" and job is "manager". If at step 108 the assertion is true, the transaction is allowed to commit at step 110. Otherwise, the transaction is rolled back and an appropriate error message is generated at step 112.

In an embodiment where hash buckets are used as ALMOs, an assertion-triggering transaction for the at_most_one_manager_per_dept assertion that is adding a "manager" to the "sales" group would:

generate the ALMO identifier "at_most_one_manager_per_dept.sales"
apply the hash function to the string "at_most_one_manager_per_dept.sales" to produce the hash value HASH1
obtain a lock on the bucket of the hash table that corresponds to HASH1

Similarly, the assertion-triggering transaction for the at_most_one_manager_per_dept that is adding a "manager" to the "IT" group would:

generate the ALMO identifier "at_most_one_manager_per_dept.IT"
apply the hash function to the string "at_most_one_manager_per_dept.IT" to produce the hash value HASH2
obtain a lock on the bucket of the hash table that corresponds to HASH2

If the hash table is sufficiently large, it is unlikely that two distinct ALMO identifiers will hash to the same bucket of the hash table.

SINGLE-SET-UQ Assertion Example: The Zero_Or_More_Than_One_Emp_Per_Dept Assertion As another example, consider the following assertion that mandates that no department can have exactly one employee.

```
create assertion zero_or_more_than_one_emp_per_dept
    (not exists
        (select 'dept with one employee'
        from EMPLOYEES e
        group by e.deptno
        having count(*) = 1))
```

The zero_or_more_than_one_emp_per_dept assertion is a SINGLE-SET-UQ assertion. The compile-time analysis will determine that this SQL assertion can be specified with a top-level universal quantification. To understand why this is the case, here is an alternative way to specify this SQL assertion using formal logic (which supports a for all quantifier not available in SQL).

```
(forall d in {e.DEPTNO | e in EMPLOYEES}:
    #{ e | e in EMPLOYEES and e.DEPTNO = d } != 1)
```

Figure 5:
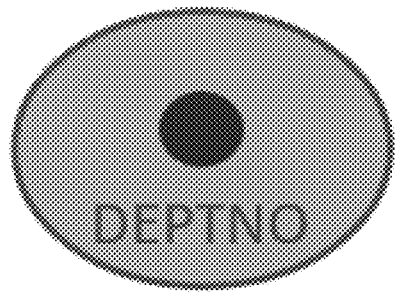
FIG. 5 is a block diagram of a UQ-JoinGraph of a zero_or_more_than_one_emp_per_dept assertion.

This represents a universal quantification over the set of DEPTNO values that are provided by the EMPLOYEE.DEPTNO column. The top-level universal quantification (UQ) of this SQL assertion is represented by a UQ-JoinGraph, as illustrated in FIG. 5. As shown in FIG. 5, the UQ-JoinGraph zero or_more_than_one_emp_per_dept assertion has a single vertex representing the table involved in the quantification and indicating inside the vertex the column name that provides the set of values over which is quantified.

With respect to guard queries, during the compile-time analysis of the zero_or_more_than_one_emp_per_dept assertion the database server determines that this SQL assertion can be violated when the change effect of the DML statement has one of the following properties.

A new employee row is inserted
An existing employee row is deleted
An existing employee row is updated from one department to another department Since the SQL assertion constitutes a universal quantification, the DBMS is able to revalidate it in an incremental manner: i.e. only revalidate the DEPTNO-values that are affected.

SINGLE-SET-UQ Assertion Example: The No_Trainers_In_Boston Assertion

Another example of a SINGLE-SET-UQ assertion is a no_trainers_in_boston assertion that mandates that no employee in Boston can be designated to have the job "trainer". This assertion may be specified as follows:

```
create assertion no_trainers_in_boston
    (not exists ?
        (select 'trainer in boston'
        from EMPLOYEES e, DEPARTMENTS D
        where e.job = 'TRAINER'
        and e.deptno = d.deptno
        and d.location = 'BOSTON'))
```

During the compile-time analysis, the database server determines that this SQL assertion can be specified with a top-level universal quantification that quantifies over the set of DEPTNO values. To understand why this is the case, here are a couple of alternative ways to specify this SQL assertion using formal logic.

```
(forall: d in DEPTARTMENTS:
    (forall e in EMPLOYEES:
        d.DEPTNO=e.DEPTNO implies (e.JOB != 'TRAINER' or
        d.LOCATION != 'BOSTON')))
(forall: e in EMPLOYEES:
    (forall d in DEPTARTMENTS:
        d.DEPTNO=e.DEPTNO implies (e.JOB != 'TRAINER' or
        d.LOCATION != 'BOSTON')))
(forall: d in DEPTARTMENTS natural-join EMPLOYEES:
    e.JOB != 'TRAINER'or d.LOCATION != 'BOSTON')
```

Figure 9:
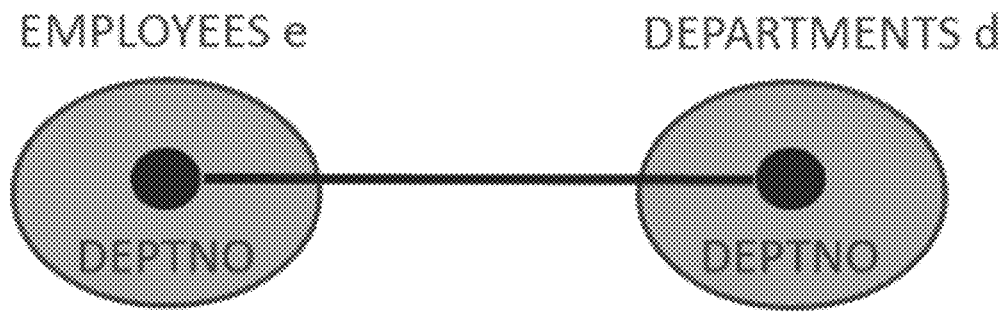
FIG. 9 is a block diagram of the UQ-JoinGraph for the no_trainers_in_boston assertion, according to an embodiment.

Both the EMPLOYEES.DEPTNO and the DEPARTMENTS.DEPTNO columns can provide values for the set over which is quantified. The top-level universal quantification of this SQL assertion may be represented using a UQ-JoinGraph with two vertices representing the two columns involved in the quantification, and one edge reflecting the join-condition between these table columns, as illustrated in FIG. 9.

During the compile-time analysis, the database server determines that this SQL assertion can only be violated by a DML statement whose effect is that possibly a trainer is introduced in Boston. In addition, the guard-query will produce the DEPTNO-value(s) that need to be revalidated. The no trainers in boston assertion is a SINGLE-SET-UQ assertion because only one set of values (i.e. the set of departments) is quantified.

SINGLE-SET-UQ Assertion Example: Cannot_Supply_All_Parts Assertion

SINGLE-SET-UQ assertions can also involve other tables that play no role in any top-level universal quantification view of the SQL assertion. To illustrate this, consider the following example SQL assertion that states that a supplier cannot supply all parts:

```
create assertion cannot_supply_all_parts as
    check(not exists
        (select 'a supplier'
        from supplier S
        where not exists
            (select 'a part'
            from part P
            where not exists
                (select 'a SP'
                from supplier_part SP
                where SP.p# = P.p# and
                SP.s# = S.s#))))
```

During compile-time analysis of the cannot supply all_parts assertion, the database server will find this is a universal quantification. A formal way to specify this assertion is as follows:

```
(forall: s in SUPPLIER:
    (exists p in PART:
        not(exists p in SUPPLIER_PART: s.S# = sp.S# and sp.P# = p.P#)))
```

Figure 10:
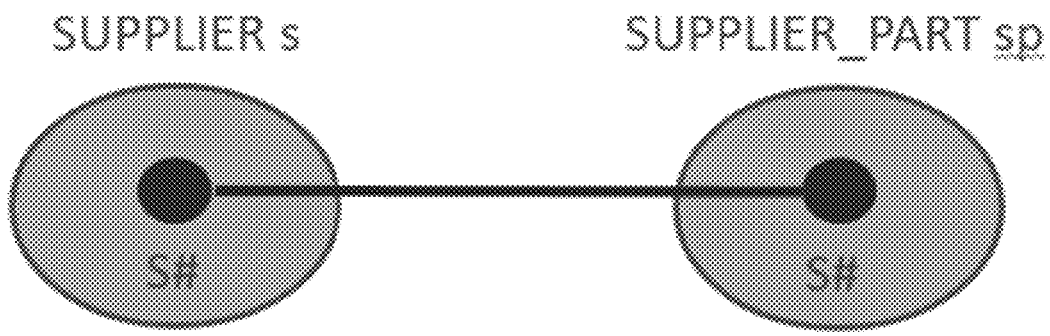
FIG. 10 is a block diagram of the UQ-JoinGraph for the cannot_supply_all_parts assertion, according to an embodiment.

In the cannot_supply_all_parts assertion, the quantification is over the set of S#-values provided by the SUPPLIER.S# column, and through transitivity also supplied by the SUPPLIER PART.S# column. The top-level quantification of the cannot supply all_parts assertion can be represented in the UQ-JoinGraph illustrated in FIG. 10. It should be noted that the PARTS table plays no role in this UQ-JoinGraph.

During the compile-time analysis of the cannot_supply_all_parts assertion, the database server will also determine that the SQL assertion can be violated by a DML, statement whose effect is:

The introduction of a new SUPPLIER row
The introduction of a new SUPPLIER_PART row
The removal of a PART row In first two cases, the guard query will produce the S#-value(s) that are in need of revalidation. The cannot supply all_parts assertion is a SINGLE-SET-UQ assertion because there is only one set of values (i.e. the suppliers) quantified.

Using ALMOs to Enforce SINGLE-SET-UQ Assertions

If an assertion X is a SINGLE-SET-UQ assertion, then the UQ-JoinGraph of assertion X will have a single join-group. Under these circumstances, the database server merely causes transaction T to obtain a shared lock on the name of the assertion, and an exclusive lock on the relevant assertion/group combination. These locks can be notated as follows:

```
Lock(hash('name-of-sql-assertion'),S)
For each value out of the quantified set of values (produced by the Guard
Query) that requires revalidation:  lock(hash('name-of-sql-assertion'||'
[quantified value]'),X)
```

It is possible for SINGLE-SET-UQ assertions to reference a table that is not involved in the UQ-JoinGraph. Upon execution of a DML statement on any of the tables involved in the SQL assertion but not involved in the UQ-JoinGraph, and whose change effect is such that the Guard Query detects the need for revalidation, the database server causes transaction X to acquire an assertion-level exclusive lock:

```
lock(hash('name-of-sql-assertion'),X)
```

The rationale for this locking strategy for SINGLE-SET-UQ assertions is that since the SQL assertion constitutes of a top-level universal quantification, revalidation will only require evaluation of the Boolean expression for the subset of quantified values that were affected by the DML statement. For this evaluation to be stable, only one transaction is allowed to potentially violate any member in this subset at a point in time (X-mode on quantified values).

As mentioned above, the SQL assertion can involve other tables that are not involved in the quantification. When DML statements modify these other tables, a full evaluation of the Boolean expression is required. For this evaluation to be stable there cannot be any other transaction involved in revalidating this SQL assertion: the S and X modes on 'name-of-sql-assertion' prevent this.

With this locking strategy for SINGLE-SET-UQ assertions, two concurrently executing assertion-triggering transactions for the no-trainers-in-boston SQL assertion would execute in the sequence illustrated in FIG. 6.

Note that with this locking strategy for SINGLE-SET-UQ assertions, the database server allows other transactions to affect other departments, since the first lock is shareable, and the second lock only blocks if the same department number is involved.

FIG. 7 illustrates how the database server handles two concurrently executing assertion-triggering transactions for the no-supplier-supplies-all-parts SQL assertion.

MULTI-SET-UQ ASSERTIONS

As explained above, a "MULTI-SET-UQ assertion" is an assertion that universally quantifies over multiple sets of values. The S_SP_P assertion discussed above is an example of a MULTI-SET-UQ assertion.

As explained above, the S_SP_P assertion mandates that there cannot be high-risk suppliers that supply a part whose price is 1000 or more.

```
create assertion S_SP_P as
   check(not exists
      (select 'a tuple in this join' from supplier S, supplier_part SP, part P
      where s.S# = sp.S# and
      sp.P# = p.P# and
      s.TYPE = 'HIGH RISK' and
      p.PRICE >= 1000))
```

During compile-time analysis of the S_SP_P assertion, the database server will determine that the S_SP_P assertion qualifies as an assertion with multiple top-level nested universal quantifications. Ways to specify this are as follows:

```
(forall: s in SUPPLIER:
   (forall sp in SUPPLIER_PART:
      (forall p in PART:
         (s.S#=sp.S# and sp.P#=p.P#) implies (s.TYPE!='HIGH RISK' or
      p.PRICE<1000))))
```

Note the order of the three top-level quantifiers is commutative. The following alternative specification clarifies this:

```
(forall: sspp in SUPPLIER natural-join SUPPLIER_PART natural-join
         PART: s.TYPE!='HIGH RISK' or p.PRICE<1000)
```

Figure 8:
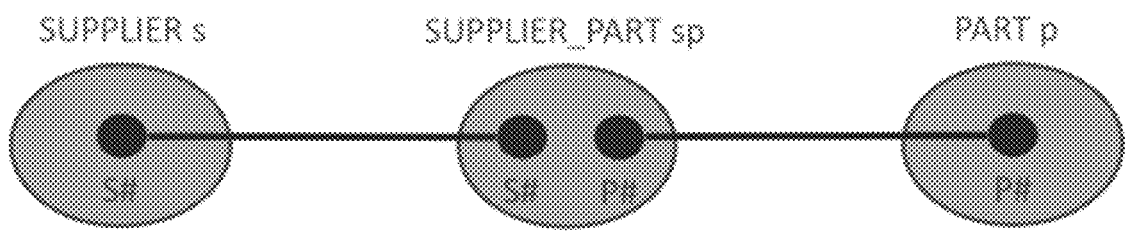
FIG. 8 is a block diagram of the UQ-JoinGraph for the S_SP_P assertion, according to an embodiment.

The top-level quantification structure may be represented in a UQ-JoinGraph as illustrated in FIG. 8. Referring to FIG. 8, the UQ-JoinGraph for the S_SP_P assertion shows there are two distinct top-level sets over which the S_SP_P assertion is universally quantified: the set of S#-values (provided by SUPPLIER. S# and SUPPLIER_PART.S#) and the set of P#-values (provided by SUPPLIER PART.P# and PART.P#). Thus, the S_SP_P qualifies as a MULTI-SET-UQ assertion.

The edges of the UQ_JoinGraph of FIG. 8 represent the join-conditions between these columns. As shown in FIG. 8, the UQ-JoinGraph of the S_SP_P assertion consists of two "join-groups". One join-group connects SUPPLIER and SUPPLIER_PART using S#-values, and another join-group connects SUPPLIER_PART and PART using P#-values.

With respect to guard queries for the S_SP_P SQL assertion, during the compile-time analysis of the S_SP_P SQL assertion, the database server will determine that the S_SP_P SQL assertion can only be violated by a DML statement whose effect it is to introduce a tuple into this three-table join for which the supplier is high-risk and the part's price is 1000 or more. The guard-query will therefore produce:

The S# value(s) in case the DML statement operated on the SUPPLIER table.
The P# value(s) in case the DML statement operated on the PART table.
Both the S# and P# values in case the DML statement operated on the SUPPLIER_PART table.

Reachability and Join Groups

Within UQ-JoinGraphs, if a path from a first vertex (representing a first table) can reach a second vertex (representing a second table) without moving from one quantification to another, then the second vertex is "reachable" by the first vertex. Similarly, the second table is "reachable" by the first table. Stated another way, a table X is reachable from table Y, if table X "connects" to table Y via the same set of quantified values. A set of tables that are reachable to each other in the UQ-JoinGraph are referred to herein as a "join group".

Referring again to the UQ-JoinGraph of the S_SP_P assertion, illustrated in FIG. 8, the following is true:

From S, SP is reachable but P is not reachable because reaching P from S involves moving from one quantification (the one over the set of S# values) to another one (the one over the set of P# values).

From SP, both S and P are reachable.

From P, SP is reachable and S is not reachable.

Figure 11:
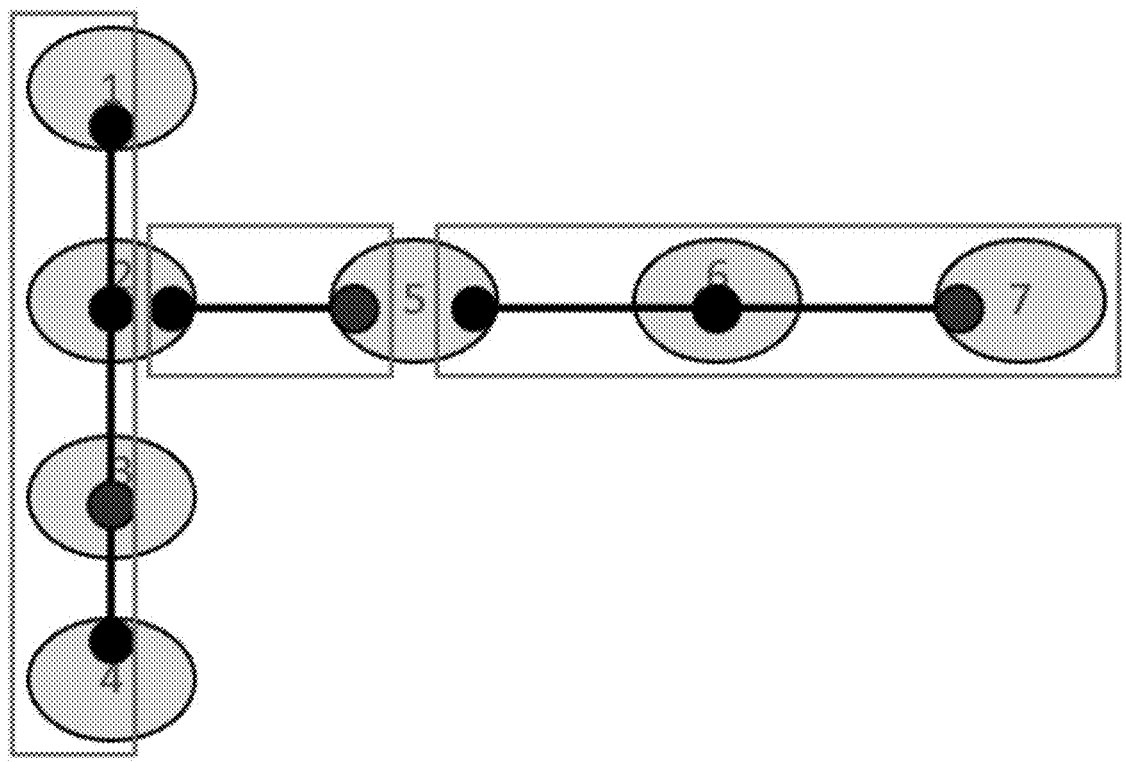
FIG. 11 is a block diagram of the UQ-JoinGraph for an assertion with three join groups, according to an embodiment.

To further illustrate the concepts of reachability and join groups, consider the UQ-JoinGraph illustrated in FIG. 11. Referring to FIG. 11, the illustrated UQ-JoinGraph shows three join-groups. Tables 1 through 4 are all connected via the same set of (join-column) values. Tables 1 through 4 can all reach each other since they are a member of the same join-group. Furthermore, table 5 is also reachable from table 2. Tables 1, 3 and 4 cannot reach 5. From 5, tables 2, 6 and 7 are reachable. From tables 6 and 7, only table 5 is reachable.

Lock Modes Used to Enforce MULTI-SET-UQ Assertions

While it is possible to enforce a MULTI-SET-UQ assertion by requiring all assertion-triggering transactions to acquire an exclusive lock on an assertion-level ALMO, such enforcement would be coarser than necessary. For example, consider the S_SP_P assertion described above. As long as all assertion-triggering transactions are merely updating the SUPPLIER table, there is no reason that the assertion-triggering transactions cannot execute in parallel. That is, whether a change to the SUPPLIER table violates the S_SP_P assertion is not affected by other changes to the SUPPLIER table, so assertion-triggering transactions that are updating the SUPPLIER table need not see the changes made by other assertion-triggering transactions that are also updating the SUPPLIER table. Note that the SUPPLIER table is part of one join-group.

Similarly, as long as assertion-triggering transactions are merely updating the PART table, there is no reason that the assertion-triggering transactions cannot execute in parallel. Whether a change to the PART table violates the S_SP_P assertion is not affected by other changes to the PART table, so assertion-triggering transactions that are updating the PART table need not see the changes made by other assertion-triggering transactions that are also updating the PART table.

However, there cannot be an assertion-triggering transaction TX1 on the SUPPLIER table executing at the same time as an assertion-triggering transaction TX2 on the PART table. Since the SUPPLIER table is part of one join-group, the guard-query in TX1 produces S# values only, and cannot produce P# values. TX1 validation code can potentially query any rows of the PART table, and therefore requires the PART table to be stable with respect to the assertion. Conversely, since the PART table too is part of only one join-group, in TX2 the guard query only produces P# values and TX2 requires the SUPPLIER table to be stable with respect to the assertion.

Because an assertion-level lock would prevent concurrent execution of assertion-triggering transactions that can be safely executed in parallel, assertion-level locks are unduly restrictive for MULTI-SET-UQ assertions. Rather than use assertion-level locks to prevent concurrent execution of assertion-triggering transactions, the database server makes use of share locks (S locks), share-exclusive locks (SX locks) and exclusive locks (X) locks, in the manner described hereafter.

Using ALMOs to Enforce MULTI-SET-UQ Assertions

Every MULTI-SET-UQ assertion has a UQ-JoinGraph that includes multiple join-groups. The strategy required to serialize assertion-triggering transactions for MULTI-SET-UQ assertions depends on what table of the join-graph was being modified by the potentially violating DML statement in the assertion-triggering transaction. Specifically, the required locks differ based on whether the table in question belongs to one join-group, multiple join-groups, or to no join-group at all, within the UQ-JoinGraph of the MULTI-SET-UQ assertion.

Changes to Tables that Belong to a Single Join-Group

Assume that a table T is being modified by an assertion-triggering transaction TX, and within the UQ-JoinGraph for a MULTI-SET-UQ assertion X, table T is a member of a single join-group (JG1). Under these circumstances, prior to re-evaluating assertion X to determine whether changes made by transaction TX violate assertion X, the database server causes the transaction TX to obtain the following locks:

Lock(hash('name-of-sql-assertion',S)
    Lock(hash('name-of-sql-assertion'||'JG1||'[quantified value within JG1]'),X)
    Lock(hash('name-of-sql-assertion'||'T'), SX)

In addition, for every other table, say TO, in the join-graph of assertion X that is unreachable from table T, the database server causes the transaction TX to obtain the following locks:

Lock(hash(name-of-sql-assertion'||'TO'),S)

Changes to Tables that Belong to Multiple Join-Groups

Assume that table T is a member of multiple join-groups in the UQ-JoinGraph of assertion X. In this case, guard-queries will produce values for each of the involved join-groups. Under these circumstances, prior to re-evaluating assertion X to determine whether changes made by transaction TX to table T violate assertion X, the database server causes the transaction TX to obtain the following locks:

Lock(hash('name-of-sql-assertion',S)
For each join-group, say JGn, that T is a member of:
    Lock(hash('name-of-sql-assertion'||'JGn'||'[quantified value within JGn]'),X)
Lock(hash('name-of-sql-assertion'||'T'), SX)

In addition, for every other table, say TO, in the join-graph that is unreachable from table T:

Lock(hash('name-of-sql-assertion'||'TO''); S)

Changes to Tables that Cannot Act as a Driver for the Top-Level UQ of an Assertion In scenarios where the assertion-triggering transaction performs DML on a table that cannot act as driver for values of any of the for top-level UQs, or put otherwise where that table does not belong to any of the join-groups in the UQ-join-graph, the database server causes the transaction to obtain an assertion-level lock:

lock(hash('name-of-sql-assertion'),X)

A MULTI-SET-UQ SQL assertion has multiple top-level nested universal quantifications, which are commutative. Depending on the involved table being changed by a DML statement, the database server can view the quantifier that is driven by that table as the top-level quantifier. Each such case can be dealt with using the locking techniques described above for SINGLE-SET-UQ assertions. Since MULTI-SET-UQ assertions have multiple join-groups, the database server also needs to serialize transactions that involve different join-groups (or more precisely, that involve mutually unreachable tables). For this, the database server causes the assertion-triggering transaction to acquire the SX mode on the table-name that is affected by the dml-statement, and the S modes on all non-reachable table-names.

Using the MULTI-SET-UQ locking rules set forth above, concurrently executing assertion-triggering transactions for the "High-risk Supplier Cannot Supply Parts Costing 1000 or More" assertion may proceed as illustrated in FIG. 12.

Pseudo-Code Example

The following pseudo-code illustrates how the assertion-triggering transaction serialization techniques described herein may be implemented, according to one embodiment. Specifically, assume that:

SQL assertions have been registered with a database server
    UQ-JoinGraphs and guard queries have been generated for those SQL assertions
    A transaction has executed a DML statement on table T.
    The effect of the DML has been maintained, so that the guard queries may be executed against the effect of the DML Under these circumstances, prior to committing the transaction, the database server may proceed as follows:

```
for (every SQL assertion SA that has table T involved)
loop
--
for (every reference RT of table T in SA)
loop
--
if (Guard-Query GQ of SA for RT signals possible need for
revalidation)
then
--
if (UQ-JoinGraph UQJG of SA is empty) /* NO-SET */
then
  --
  lock(hash([name-of-SA],X);
  revalidate_full(SA);
  --
elsif (UQ-JoinGraph UQJG of SA consists of a single join-group
JG) /* SINGLE-SET */
then
  --
  if (RT is a vertice in JG)
  then
  --
  lock(hash([name-of-SA],S);
  --
  for (every value V produced by GQ)
  loop
  --
  lock(hash([name-of-SA]||V),X)
  --
  end loop
  --
  revalidate_incremental(SA);
  --
  else /* RT is not a vertice in JG */
  --
  lock(hash([name-of-SA],X);
  revalidate_full(SA);
```

```
--
end if;
--
else /* UQ-JoinGraph UQJG of SA consists of multiple join-groups)
--
  if (RT is a vertice in UQJG)
  then
    --
    lock(hash([name-of-SA],S);
    lock(hash([name-of-SA]||RT), SX);
    --
  if (RT is a vertice of a single join-group JG in UQJG)
  then
    --
    for (every vertice OTi in UQJG that cannot be reached from RT) --
    i varies loop
      --
      lock(hash([name-of-SA]||OTi),S);
      --
    end loop;
    --
    for (every value V produced by GQ)
    loop
      --
      lock([name-of-SA]||JG||V,X);
      --
    end loop
    --
    revalidate_incremental(SA);
    --
  else /* RT is a vertice of multiple join-groups in UQJG,
  i.e. it connects multiple join-groups */
    --
    for (every vertice OTi in UQJG that cannot be reached from RT) --
    i varies loop
      --
      lock(hash([name-of-SA]||OTi),S);
      --
    end loop;
    --
    for (each join-group JGi that RT is vertice of) -- i varies
      loop
        --
        for (every value V that GQ produces for JGi)
        loop
          --
          lock(hash([name-of-SA]||JGi||V,X);
          --
        end loop;
        --
      end loop;
      --
      revalidate_incremental(SA);
      --
    end if;
    --
  else /* RT is not a vertice in UQJG */
    --
    lock(hash([name-of-SA],'X');
      revalidate_full(SA);
      --
    end if;
    --
  end if;
  --
end loop;
--
end loop;
```

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
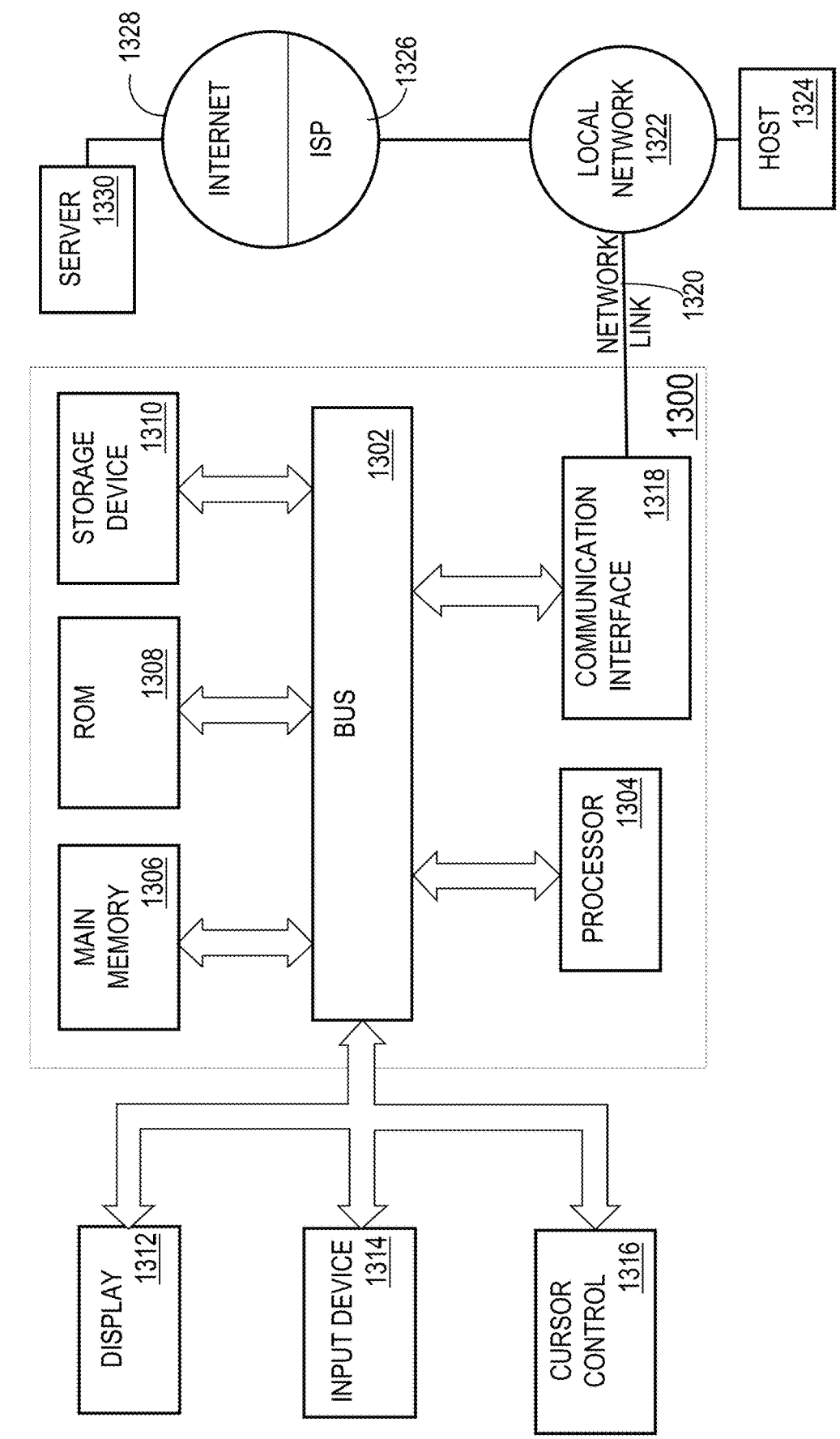
FIG. 13 is a block diagram illustrating a computing device upon which embodiments of the invention may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising: receiving, at a database server, a request to register a SQL assertion, wherein the SQL assertion is a MULTI-SET-UQ assertion; after the SQL assertion is registered, the database server detecting that an uncommitted transaction performed an assertion-triggering DML (Data Manipulation Language) operation on a table referenced in the SQL assertion; prior to committing the uncommitted transaction, performing the steps of: determining that the table belongs to a single join-group of a UQ-JoinGraph of the SQL assertion; obtaining a plurality of looks, the plurality of locks comprising: a share lock on a first memory object that corresponds to the entire SQL assertion; an exclusive lock on a second memory object that corresponds to a combination of: the SQL assertion; the single join group; and a quantified value within the single join group; a share-exclusive lock on a third memory object that corresponds to a combination of: the SQL assertion; and the table; after obtaining the plurality of locks, determining whether the assertion-triggering DML operation violated the SQL assertion; if the assertion-triggering DML operation violated the SQL assertion, then preventing the uncommitted transaction from committing; wherein the method is performed by one or more computing devices.

2. The method of claim 1 wherein:
the UQ-JoinGraph of the SQL assertion includes a first vertex that corresponds to the table;
the UQ-JoinGraph of the SQL assertion includes a second vertex that corresponds to a second table;
the second vertex is not reachable from the first vertex;
the plurality of locks further comprises a share lock on a fourth memory object that corresponds to a combination of:
the SQL assertion; and
the second table.

3. The method of claim 1 further comprising:
generating a guard query for the SQL assertion;
wherein the database server detecting that an uncommitted transaction performed an assertion-triggering DML operation on a table referenced in the SQL assertion includes, as part of the uncommitted transaction, executing the guard query against changes made by the uncommitted transaction.

4. The method of claim 1 wherein obtaining an exclusive lock on a second memory object that corresponds to a combination of the SQL assertion, the single join group, and a quantified value within the single join group comprises:
generating a hash key by combining a string that identifies the SQL assertion, a string that identifies the single join group, and a string that identifies the quantified value;
applying a hash function to the hash key to produce a hash value;
identifying a hash bucket that corresponds to the hash value; and
obtaining an exclusive lock on the hash bucket.

5. The method of claim 1 wherein determining whether the assertion-triggering DML operation violated the SQL assertion is performed by inspecting only rows that are associated with the quantified value within the single join group.

6. A method comprising: receiving, at a database server, a request to register a SQL assertion, wherein the SQL assertion is a MULTI-SET-UQ assertion; after the SQL assertion is registered, the database server detecting that an uncommitted transaction performed an assertion-triggering DML (Data Manipulation Language) operation on a table referenced in the SQL assertion; prior to committing the uncommitted transaction, performing the steps of: determining that the table belongs to a plurality of join-groups of a UQ-JoinGraph of the SQL assertion; obtaining a plurality of locks, the plurality of locks comprising; a share lock on a first memory object that corresponds to the entire SQL assertion; for each join-group of the plurality of join-groups, an exclusive lock on a respective memory object that corresponds to a combination of: the SQL assertion; the join group; and a quantified value within the join group; a share-exclusive lock on a third memory object that corresponds to a combination of: the SQL assertion; and the table; after obtaining the plurality of locks, determining whether the assertion-triggering DML operation violated the SQL assertion; if the assertion-triggering DML operation violated the SQL assertion, then preventing the uncommitted transaction from committing; wherein the method is performed by one or more computing devices.

7. The method of claim 6 wherein:
the UQ-JoinGraph of the SQL assertion includes a first vertex that corresponds to the table;
the UQ-JoinGraph of the SQL assertion includes a second vertex that corresponds to a second table;
the second vertex is not reachable from the first vertex;
the plurality of locks further comprises a share lock on a fourth memory object that corresponds to a combination of:
the SQL assertion; and
the second table.

8. One or more non-transitory computer-readable media storing instructions which, when executed by one or more computing devices, cause: receiving, at a database server, a request to register a SQL assertion, wherein the SQL assertion is a MULTI-SET-UQ assertion; after the SQL assertion is registered, the database server detecting that an uncommitted transaction performed an assertion-triggering DML (Data Manipulation Language) operation on a table referenced in the SQL assertion; prior to committing the uncommitted transaction, performing the steps of: determining that the table belongs to a single join-group of a UQ-JoinGraph of the SQL assertion; obtaining a plurality of locks, the plurality of locks comprising: a share lock on a first memory object that corresponds to the entire SQL assertion; an exclusive lock on a second memory object that corresponds to a combination of: the SQL assertion; the single join group; and a quantified value within the single join group; a share-exclusive lock on a third memory object that corresponds to a combination of: the SQL assertion; and the table; after obtaining the plurality of locks, determining whether the assertion-triggering DML operation violated the SQL assertion; and if the assertion-triggering DML operation violated the SQL assertion, then preventing the uncommitted transaction from committing.

9. The one or more non-transitory computer-readable media of claim 8 wherein: the UQ-JoinGraph of the SQL assertion includes a first vertex that corresponds to the table; the UQ-JoinGraph of the SQL assertion includes a second vertex that corresponds to a second table; the second vertex is not reachable from the first vertex; the plurality of locks further comprises a share lock on a fourth memory object that corresponds to a combination of: the SQL assertion; and the second table.

10. The one or more non-transitory computer-readable media of claim 8 wherein the instructions further cause:
generating a guard query for the SQL assertion;
wherein the database server detecting that an uncommitted transaction performed an assertion-triggering DML operation on a table referenced in the SQL assertion includes, as part of the uncommitted transaction, executing the guard query against changes made by the uncommitted transaction.

11. The one or more non-transitory computer-readable media of claim 8 wherein obtaining an exclusive lock on a second memory object that corresponds to a combination of the SQL assertion, the single join group, and a quantified value within the single join group comprises:
generating a hash key by combining a string that identifies the SQL assertion, a string that identifies the single join group, and a string that identifies the quantified value;
applying a hash function to the hash key to produce a hash value;
identifying a hash bucket that corresponds to the hash value; and
obtaining an exclusive lock on the hash bucket.

12. The one or more non-transitory computer-readable media of claim 8 wherein determining whether the assertion-triggering DML operation violated the SQL assertion is performed by inspecting only rows that are associated with the quantified value within the single join group.

13. One or more non-transitory computer-readable media storing instructions which, when executed by one or more computing devices, cause:
receiving, at a database server, a request to register a SQL assertion, wherein the SQL assertion is a MULTI-SET-UQ assertion; after the SQL assertion is registered, the database server detecting that an uncommitted transaction performed an assertion-triggering DML (Data Manipulation Language) operation on a table referenced in the SQL assertion; prior to committing the uncommitted transaction, performing the steps of: determining that the table belongs to a plurality of join-groups of a UQ-JoinGraph of the SQL assertion; obtaining a plurality of locks, the plurality of locks comprising: a share lock on a first memory object that corresponds to the entire SQL assertion; for each join-group of the plurality of join-groups, an exclusive lock on a respective memory object that corresponds to a combination of: the SOL assertion; the join group; and a quantified value within the join group; a share-exclusive lock on a third memory object that corresponds to a combination of: the SQL assertion; and the table; after obtaining the plurality of locks, determining whether the assertion-triggering DML operation violated the SQL assertion; and if the assertion-triggering DML operation violated the SQL assertion, then preventing the uncommitted transaction from committing.

14. The one or more non-transitory computer-readable media of claim 13 wherein: the UQ-JoinGraph of the SQL assertion includes a first vertex that corresponds to the table; the UQ-JoinGraph of the SQL assertion includes a second vertex that corresponds to a second table; the second vertex is not reachable from the first vertex; the plurality of locks further comprises a share lock on a fourth memory object that corresponds to a combination of: the SQL assertion; and the second table.

* * * * *